(12) United States Patent
Guo et al.

(10) Patent No.: US 8,177,426 B2
(45) Date of Patent: May 15, 2012

(54) SUB-THRESHOLD CMOS TEMPERATURE DETECTOR

(75) Inventors: Shubao Guo, Suzhou (CN); Jie Jin, Suzhou (CN); Zhenguo Sun, Suzhou (CN); Lei Tian, Suzhou (CN); Xiaowen Wu, Shanghai (CN)

(73) Assignee: Freescale Semiconductor, Inc., Austin, TX (US)

( * ) Notice: Subject to any disclaimer, the term of this patent is extended or adjusted under 35 U.S.C. 154(b) by 472 days.

(21) Appl. No.: 12/510,277

(22) Filed: Jul. 28, 2009

(65) Prior Publication Data

US 2011/0001546 A1 Jan. 6, 2011

(30) Foreign Application Priority Data

Jul. 3, 2009 (CN) .......................... 2009 1 0142600

(51) Int. Cl.
*G01K 7/00* (2006.01)
(52) U.S. Cl. ........................ 374/178; 327/512
(58) Field of Classification Search .................. 374/178; 327/512

See application file for complete search history.

(56) References Cited

U.S. PATENT DOCUMENTS

| | | | |
|---|---|---|---|
| 4,475,103 A * | 10/1984 | Brokaw et al. ................ | 340/501 |
| 5,039,878 A | 8/1991 | Armstrong et al. | |
| 6,346,848 B1 * | 2/2002 | Shkap ........................... | 327/538 |
| 6,921,199 B2 * | 7/2005 | Aota et al. ..................... | 374/178 |
| 2003/0123520 A1 | 7/2003 | Tesi | |
| 2004/0104763 A1 | 6/2004 | Pai | |
| 2007/0030049 A1 | 2/2007 | Yoshikawa | |
| 2007/0041425 A1 | 2/2007 | Lee et al. | |
| 2007/0098041 A1 | 5/2007 | Seo | |
| 2009/0110027 A1 * | 4/2009 | Chellappa ..................... | 374/178 |
| 2009/0129438 A1 * | 5/2009 | Pan ............................... | 374/170 |

* cited by examiner

*Primary Examiner* — Lisa Caputo
*Assistant Examiner* — Mirellys Jagan
(74) *Attorney, Agent, or Firm* — Charles Bergere

(57) ABSTRACT

A CMOS temperature detection circuit includes a start-up circuit for generating a start-up voltage (VN), and a proportional to absolute temperature (PTAT) current generator coupled to the start-up circuit for generating a PTAT current. The start-up voltage turns on the PTAT current generator, and the PTAT current generator uses the sub-threshold characteristics of CMOS to generate the PTAT current. A PTAT voltage generator coupled to the PTAT current generator receives the PTAT current and generates a PTAT voltage and an inverse PTAT voltage (VBE). A comparator circuit coupled to the voltage generator compares the inverse PTAT voltage to first and second alarm limits, which are defined using the generated PTAT voltage, and generates an alarm signal based on the comparison results.

20 Claims, 3 Drawing Sheets

SUB-THRESHOLD CMOS TEMPERATURE DETECTOR

BACKGROUND OF THE INVENTION

This present invention relates generally to temperature detection circuits, and more particularly to a low supply voltage and low power consumption temperature detector.

Thermal performance has become an increasingly important characteristic of integrated circuits (ICs). For one, such circuits behave differently at different temperatures. For example, as the temperature of a circuit changes, the electrical characteristics of the circuit also change, such as threshold voltage level, electron mobility, wiring/contact resistance, etc. Also, internally generated voltages used by various sub-systems in an IC are sensitive to temperature changes such that performance of those systems can be compromised unless there is some way to compensate for the temperature variation. An accurate temperature detector is thus necessary to determine when a circuit is operating outside of predetermined normal operating conditions. Methods then can be initiated to compensate for high or low temperatures, that is, temperatures outside of the predetermined normal operating temperatures.

For example, if a circuit is too hot, the system frequency may be reduced in order to decrease the circuit temperature. Conversely, if the temperature is low, the system frequency may be increased in order to improve performance. Additionally, some circuits or components may need to be shut-down when the temperature exceeds a predetermined threshold level, and in some applications, such as memories, there are instances where secret information should be erased before the memory fails due to operating at very low or high temperatures.

Further, many electronic devices, such as portable computers, cell phones, hand-held game devices and personal digital assistants, are sensitive to power consumption. That is, low power consumption is desirable in order to preserve battery power. Thus, a temperature detector circuit should consume as little power as possible.

Also, as the feature sizes of ICs are reduced, the supply voltage used by these circuits decreases. For example, a 0.7 µm CMOS device operates at around 5V, while a 0.18 µm CMOS device operates at around 1.8V or lower. Such lower operating voltages make the design of temperature sensors more challenging because at lower operating voltages the characteristics of semiconductor devices become more inconsistent. Thus, there is a need for a temperature sensor that can operate at very low voltage and consume little power.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION OF THE PRESENT INVENTION

Figure 1:
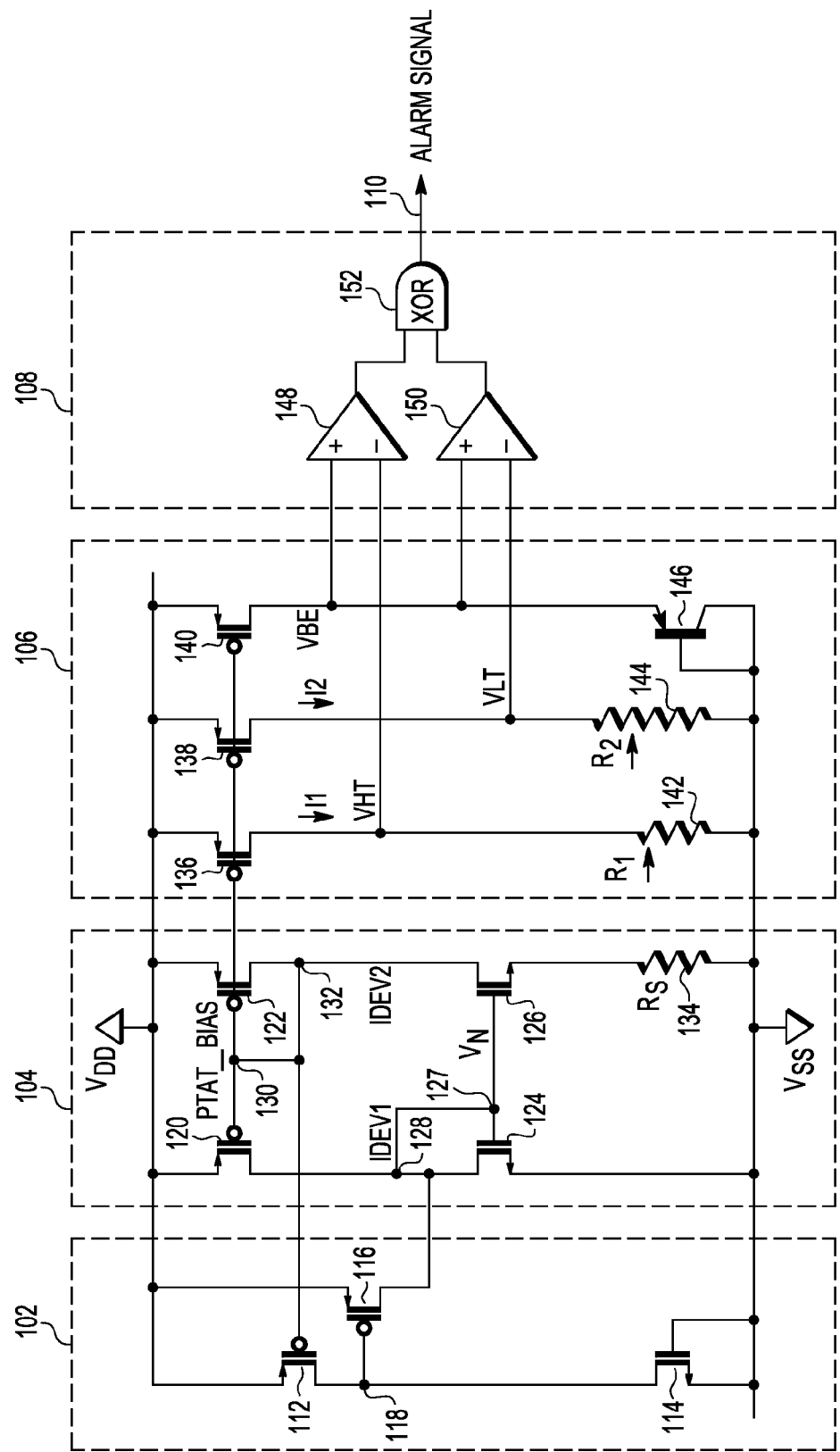
FIG. 1 is schematic circuit diagram of a temperature sensor circuit according to an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

The term "coupled," as used herein, is not intended to be limited to a direct coupling or a mechanical coupling. In addition, unless stated otherwise, terms such as "first" and "second" are used to arbitrarily distinguish between the elements such terms describe. Thus, these terms are not necessarily intended to indicate temporal or other prioritization of such elements. The terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or a slash (\) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The present invention provides a low supply voltage and low power consumption temperature detector that generates an alarm signal when a target temperature is reached. The sub-threshold characteristics of CMOS technology are used to generate a PTAT current. The PTAT current passes through a resistor and a PNP bipolar transistor, generating a PTAT voltage and an inverse PTAT voltage. A comparator compares the inverse PTAT voltage with the PTAT voltage, which is used as an alarm limit, and generates a detection result or alarm signal.

The alarm limit may be changed simply by changing the value of the resistor. That is, as will be discussed in more detail below, the slope of the PTAT voltage generated can be changed by changing the value of the resistor used to generate the PTAT voltage. The temperature detector does not require a constant reference voltage to generate alarm limits. Further, the temperature detector can operate using a supply voltage of less than 1 V, and a current of about 2.5 uA.

In one embodiment, the present invention is a CMOS temperature detection circuit including a start-up circuit for generating a start-up voltage ($V_N$), and a proportional to absolute temperature (PTAT) current generator coupled to the start-up circuit for generating a PTAT current. The start-up voltage turns on the PTAT current generator. The PTAT current generator uses the sub-threshold characteristics of CMOS to generate the PTAT current. A PTAT voltage generator is coupled to the PTAT current generator and receives the PTAT current and generates an inverse PTAT voltage (VBE) as well as the PTAT voltage, which is used as an alarm limit. A comparator circuit is coupled to the voltage generator and compares the PTAT voltage to the alarm limit and generates an alarm signal based on the comparison results.

Referring now to FIG. 1, a schematic circuit diagram of a temperature detection circuit 100 is shown. The temperature detection circuit 100 includes a start-up circuit 102, a PTAT current generating circuit 104, a PTAT voltage generating circuit 106, and a comparator 108. The temperature detection circuit 100 generates an alarm signal 110 when the temperature of an associated circuit, such as a circuit on the same semiconductor substrate, has a temperature that is either greater than a predefined high temperature value or less than a predefined low temperature values.

The start-up circuit 102 includes a first PMOS transistor 112, a first NMOS transistor 114, and a second PMOS transistor 116. The first PMOS transistor 112 and the first NMOS transistor 114 are connected in series between a first power supply Vdd and a second power supply Vss. More particularly, the first PMOS transistor 112 has a source connected to the first power supply Vdd and a drain connected to a first node 118. The first NMOS transistor 114 has a source and a gate both of which are connected to the second power supply Vss, and a drain connected to the first node 118. The second PMOS transistor 116 has a source connected to the first power supply Vdd and a gate connected to the first node 118. In one embodiment of the invention, Vdd has a value of about 0.9v and Vss is ground. As will be discussed in more detail below, the size of the first NMOS transistor 114 is larger than that of the first PMOS transistor 112 in order to define an appropriate equilibrium point for the PTAT current generating circuit 104.

The PTAT current generating circuit 104 is coupled to the start-up circuit 102. The PTAT current generating circuit 104 includes third and fourth PMOS transistors 120 and 122, and second and third NMOS transistors 124 and 126. The third PMOS transistor 120 is connected in series with the second NMOS transistor 124, and the fourth PMOS transistor 122 is connected in series with the third NMOS transistor 126. More particularly, the third PMOS transistor 120 has a source connected to the first power supply Vdd, a drain connected to a second node 128, and a gate connected to a third node 130. The second NMOS transistor 124 has a source connected to the second power supply Vss, a drain connected to the second node 128 (and thus to the drain of the third PMOS transistor 120), and a gate also connected to the second node 128. In addition, a drain of the second PMOS transistor 116 is connected to the second node 128 (and thus to the drains of the third PMOS transistor 120 and the second NMOS transistor 124).

The fourth PMOS transistor 122 has a source connected to the first power supply Vdd, a drain connected to a fourth node 132, and a gate connected to the third node 130 (and thus to the gate of the third PMOS transistor 120). The gate of the first PMOS transistor 112 also is connected to the third and fourth nodes 130 and 132 (and thus to the gates of the third and fourth PMOS transistors 120 and 122, and the drain of the fourth PMOS transistor 122). The third NMOS transistor 126 has a source connected to the second power supply Vss by way of a shunt resistor (Rs) 134, a drain connected to the fourth node 132 (and thus to the drain of the fourth PMOS transistor 122), and a gate connected to the gate of the second NMOS transistor 124. In one embodiment of the invention, the shunt resistor 134 has a value of 200 kΩ. As will be discussed in more detail below, the current generating circuit 102 uses the sub-threshold characteristics of CMOS to generate a PTAT current.

The PTAT voltage generating circuit 106 is coupled to the PTAT current generating circuit 104, and generates both a PTAT voltage and an inverse PTAT voltage. The PTAT voltage generating circuit 106 includes fifth, sixth and seventh PMOS transistors 136, 138, and 140. The fifth PMOS transistor 136 has a source connected to the first power supply Vdd and a drain connected to the second power supply Vss by way of a first resistor (R1) 142. The sixth PMOS transistor 138 has a source connected to the first power supply Vdd and a drain connected to the second power supply Vss by way of a second resistor (R2) 144. The seventh PMOS transistor 140 has a source connected to the first power supply Vdd and a drain connected to the second power supply Vss by way of a bi-polar junction transistor (BJT) 146. The BJT 146 has an emitter connected to the drain of the seventh PMOS transistor 140, a base connected to the second power supply Vss, and a collector also connected to the second power supply Vss. The gates of the fifth, sixth and seventh PMOS transistors 136, 138, 140 are connected to the third node 130.

A first current I1 moves from the fifth PMOS transistor 136 to the first resistor 142, and a high temperature voltage alarm value VHT is generated at a node between the fifth PMOS transistor 136 and the first resistor 142. Similarly, a second current I2 moves from the sixth PMOS transistor 138 to the second resistor 144, and a low temperature voltage alarm value VLT is generated at a node between the sixth PMOS transistor 138 and the second resistor 144. It should be noted that the alarm values VHT and VLT are actually the PTAT voltage but have different values because they are generated with different size resistors. The first and second resistors 142 and 144 have different sizes to define the upper and lower temperature alarm values. In one embodiment of the invention, the first resistor 142 has a value of 1200 kΩ and the second resistor 144 has a value of 500 kΩ in order to set alarm limits of about −50° C. and 130° C, respectively.

The inverse PTAT voltage (VBE) is generated by the BJT 146, and more particularly, the inverse PTAT voltage is the base-emitter voltage, VBE, of the BJT 146. As will be discussed below with reference to FIG. 2, VBE has a negative slope and intersects with the PTAT voltage or two alarm limits VHT and VLT, and as will be understood by those of skill in the art, VBE has only one value at a given temperature.

The comparator 108 compares the inverse PTAT voltage to the PTAT voltages generated, i.e., the high and low temperature alarm values and generates the alarm signal 110. In one embodiment of the invention, the comparator circuit 108 includes first and second op amps 148 and 150, and a XOR gate 152. The first op amp 148 has a positive terminal connected to the drain of the seventh PMOS transistor 140 and a negative terminal connected to the node between the fifth PMOS transistor 136 and the first resistor 142. The second op amp 150 has a positive terminal also connected to the drain of the seventh PMOS transistor 140, and a negative terminal connected to the node between the sixth PMOS transistor 138 and the second resistor R2 144. The XOR gate 152 receives the outputs of the first and second op amps 148 and 150, and performs an XOR operation on these signals to generate the alarm signal 110.

Since the comparator 108 operates under low supply voltage and low power consumption, a simple, two-stage structure is preferred, which includes a single-ended differential amplifier stage and a common-source stage, and two kinds of input pairs are used, a PMOS input pair and an NMOS input pair.

Figure 2:
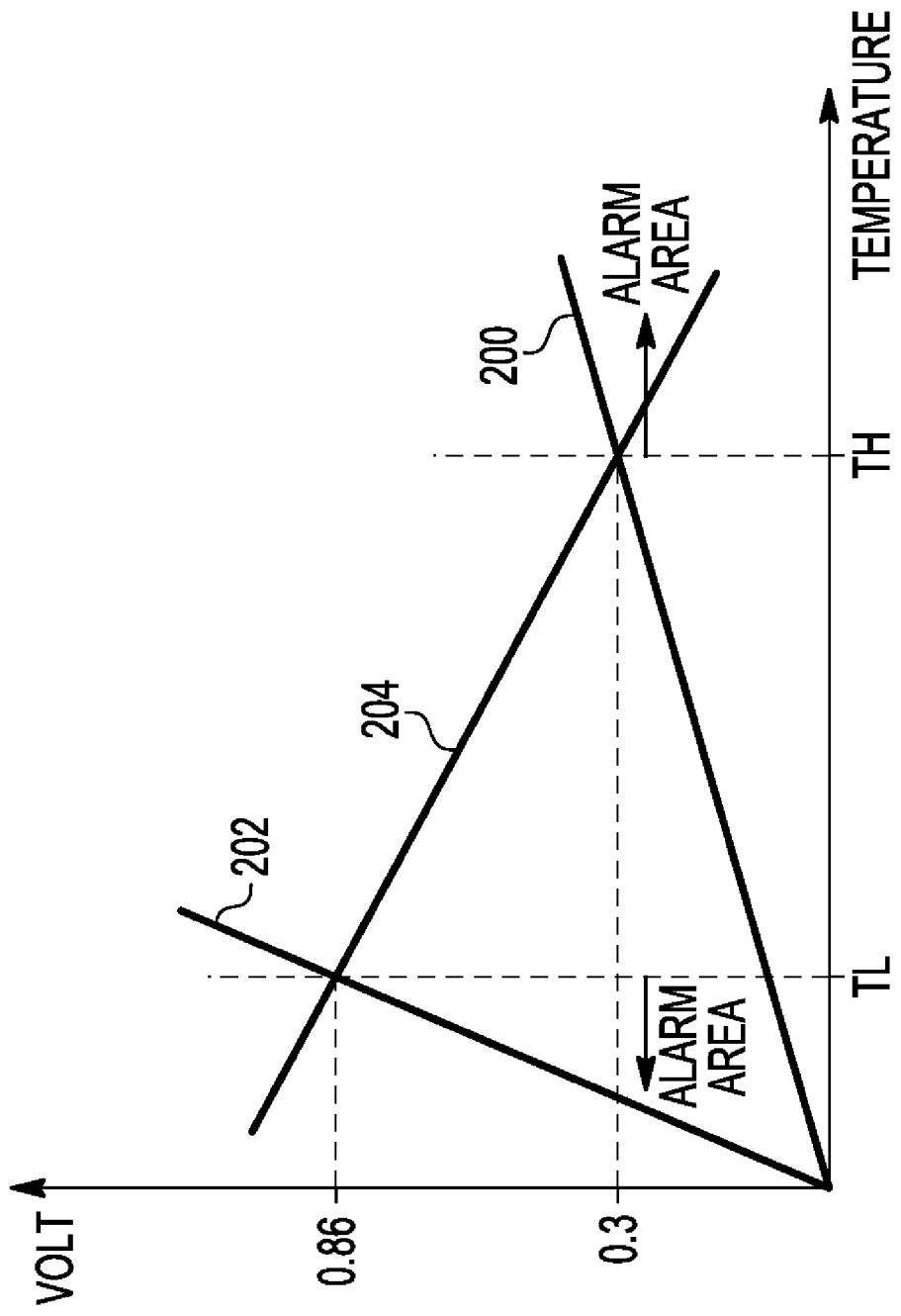
FIG. 2 is a temperature versus voltage graph showing alarm limits detectable by the circuit of FIG. 1.

Referring now to FIG. 2, a temperature versus voltage graph is shown. The graph includes two predetermined temperature limits, TL and TH. TL signifies the low temperature point where if the temperature of a circuit is determined to be less than TL, then the alarm signal is activated. TH signifies the high temperature point where if the temperature of the circuit is determined to be greater than TH, then the alarm signal is activated. While the detected temperature is between TL and TH, then the alarm signal is inactive. Line 200 represents VHT; line 202 represents VLT; and line 204 represents VBE. The cross-points, namely, where VBE line 204 intersects with the VHT and VLT lines 200 and 202 indicate the respective voltages at which the alarm signal is activated. The lines 200 and 202 are PTAT voltages generated with the resistors R1 and R2 and the points where VBE (inverse PTAT voltage) intersects the lines 200 and 202 are the alarm limits, and as discussed above, by changing the values of the resistors R1 and R2, the high and low temperature limits may be set. In one embodiment of the invention, the temperature limits are set at around −50° C. (TL) and 130° C. (TH) and the voltage VBE has a variation of about 23 mV; the VBE-VLT cross-point is near 0.8v and the VBE-VHT cross-point is at 0.3 v.

The operation and features of the start-up circuit 102 will now be discussed. If $V_N$, which is the voltage at the node 127 between the gates of the second NMOS transistor 124 and the third NMOS transistor 126, and Vptat_bias, which is the voltage at the third node 130, is are Vdd, then the PTAT current generator 104 is not operable because the transistors of the PTAT current generator 104 are all closed. Therefore, the start-up circuit 102 is provided to charge the voltage $V_N$ at the node 127 to a voltage value that will open the second and third NMOS transistors 124 and 126, and then the PTAT current generator 104 will operate. Once the PTAT current generator 104 is operating, the start-up circuit 102 is turned off because the first PMOS transistor 112 closes, and the first NMOS transistor 114 closes because the gate of the first NMOS transistor 114 is connected to its source. Then, using the property of the leakage current of the first NMOS transistor 114 being greater than the leakage current of the first PMOS transistor 112, the voltage at the first node 118 will drop, which opens the second PMOS transistor 116 so current flows from Vdd to the node 127. As the voltage $V_N$ at the node 127 increases, the second and third NMOS transistors 124 and 126 are opened, so the Vptat_bias at the third node 130 drops, which opens the first PMOS transistor 112, thereby causing the voltage at the first node 118 to go to Vdd, which in turn closes the second PMOS transistor 116, thereby shutting off the start-up circuit 102.

Accordingly, the sizes of the first PMOS transistor 112 and the first NMOS transistor 114 are important because the leakage current of the first NMOS transistor 114 should be greater than that of the first PMOS transistor 112, otherwise the voltage at the first node 118 will not drop and the second PMOS transistor 116 will not open.

The PTAT current generator 104, and more specifically the second and third NMOS transistors 124 and 126, operates in the sub-threshold region so that the first power supply voltage Vdd can be very low, e.g., 0.9 v, and therefore the temperature detection circuit 100 consumes very little power. The second and third NMOS transistors 124 and 126, and the shunt resistor Rs 134 comprise a peaking current source, while the third and fourth PMOS transistors 120 and 122, which are connected as a current mirror, realize a self-biasing function. This current mirror (transistors 120 and 122) causes the drain currents of the second and third NMOS transistors 124 and 126 to operate in peaking relation, and the voltage across the resistor Rs 134 is proportional to the absolute temperature.

When transistors operate at sub-threshold or weak inversion, the current of the drain does not drop to zero immediately for Vgs<Vth, but actually decays in an exponential fashion, similar to the operation of a bipolar transistor. When VDS is about 200 mV, the current can be expressed as:

$$I_D = I_0 \frac{W}{L} \exp \frac{V_{GS}}{nkT/q} \quad (1)$$

The currents IDEV1 and IDEV2 (shown in FIG. 1) are equal because the size of the third and fourth PMOS transistors 120 and 122 are the same. With the second and third NMOS transistors 124 and 126 working in sub-threshold operation, then:

$$I_D = I_{D0} \frac{W_{mn1}}{L} \exp \frac{V_{GS1}}{nkT/q} = I_{D0} \frac{W_{mn2}}{L} \exp \frac{V_{GS2}}{nkT/q} \quad (2)$$

$$W_{mn2} = 3 W_{mn1} \quad (3)$$

$$V_{gs2} = V_{gs1} + I_D(Rs) \quad (4)$$

From (2), (3), (4) Idev1/2 can be expressed as:

$$I_{dev1/2} = (nkT/q)(\ln 3) \frac{1}{Rs} \quad (5)$$

Where n is about 1.5, and kT/q is about 26 mV at 300K. Then, from equation (5), there is a constant PTAT current, which is independent of the supply voltage (Vdd). If the current flows through the shunt resistor Rs 134, then the PTAT voltage is independent of the first and second resistors 142 and 144 (R1, R2).

$$Vht = (nkT/q)(\ln 3) \frac{R_1}{Rs} \quad (6)$$

$$Vlt = (nkT/q)(\ln 3) \frac{R_2}{Rs}$$

Further, since VBE has a negative temperature coefficient about −1.5 mV/K, it provides for a larger voltage difference for the same variation value of temperature, which allows the cross-point to be set in accordance with the working temperature range. Then, as discussed above, if the temperature is outside of the cross point, the alarm signal 110 is activated.

Figure 3:
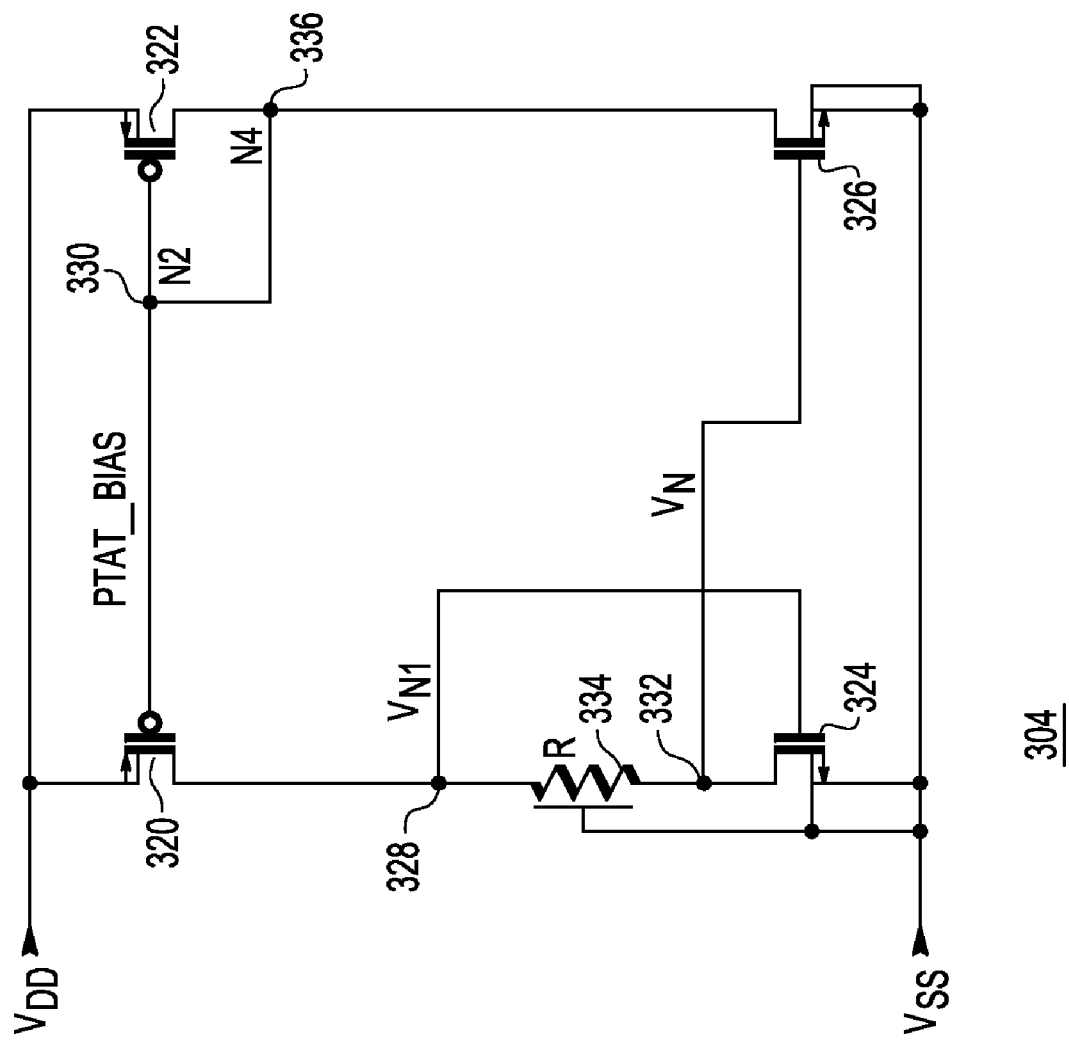
FIG. 3 is a schematic circuit diagram of a Proportional to Absolute Temperature (PTAT) current generator in accordance with another embodiment of the present invention.

Referring now to FIG. 3, an alternate embodiment of a PTAT current generating circuit 304 is shown. In this embodiment, the PTAT current generating circuit 304 includes first and second PMOS transistors 320 and 322, and first and second NMOS transistors 324 and 326. The first PMOS transistor 320 has a source connected to the first power supply Vdd, a drain coupled to a first node 328, and a gate connected to a second node 330. The first NMOS transistor 324 has a source connected to the second power supply Vss, a drain connected to a third node 332, and a gate connected to the first node 328. A resistor 334 is connected between the first PMOS transistor 320 and the first NMOS transistor 334.

The second PMOS transistor 322 has a source connected to the first power supply Vdd, a drain connected to a fourth node 336, and a gate connected to the gate of the first PMOS transistor 320 at the second node 330. In addition, the second and fourth nodes 330 and 336 are connected, which means the gate and drain of the second NMOS transistor 322 are connected to each other. The second NMOS transistor 326 has a source connected to the second power supply Vss, a drain connected to the drain of the second PMOS transistor 322 at the fourth node 336, and a gate connected to the drain of the first NMOS transistor 324 at the first node 332. The operation of the PTAT current generator circuit 304 is similar to that of the PTAT current generator circuit 104, and the transfer function is the same.

By now it should be appreciated that there has been provided a temperature detection circuit that operates in the CMOS sub-threshold region to accurately detect a circuit temperature and determine whether the circuit temperature is within predefined upper and lower bounds.

Because the apparatus implementing the present invention is, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention.

Although the invention is described herein with reference to a specific embodiment, various modifications and changes can be made without departing from the scope of the present invention as set forth in the claims below. For example, two embodiments of a PTAT current generating circuit have been provided. Further, a simple comparator 108 was disclosed. However, more complex comparator circuits can be used to a similar effect. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

What is claimed is:

1. A CMOS temperature detection circuit, comprising:
   a start-up circuit for generating a start-up voltage;
   a proportional to absolute temperature (PTAT) current generator formed using CMOS technology, coupled to the start-up circuit, for generating a PTAT current, wherein the start-up voltage turns on the PTAT current generator, and wherein the PTAT current generator uses the sub-threshold characteristics of the CMOS technology to generate the PTAT current;
   a PTAT voltage generator coupled to the PTAT current generator that receives the PTAT current and generates an inverse PTAT voltage (VBE) and a PTAT voltage, wherein first and second alarm values are derived from the PTAT voltage; and
   a comparator circuit coupled to the voltage generator for comparing the inverse PTAT voltage to the first and second alarm values, respectively, and generating an alarm signal based on the comparison results.

2. The CMOS temperature detection circuit of claim 1, wherein the start-up circuit comprises:
   a first PMOS transistor having a source connected to a first power supply;
   a first NMOS transistor having a drain connected to a drain of the first PMOS transistor at a first node, a source connected to a second power supply, and a gate connected to the second power supply; and
   a second PMOS transistor having a source connected to the first power supply, and a gate connected to the drains of the first NMOS transistor and the first PMOS transistor at the first node.

3. The CMOS temperature detection circuit of claim 2, wherein the first power supply has a value of about 0.9v and the second power supply is a ground.

4. The CMOS temperature detection circuit of claim 2, wherein a size of the first NMOS transistor is larger than that of the first PMOS transistor.

5. The CMOS temperature detection circuit of claim 2, wherein a leakage current of the first NMOS transistor is greater than a leakage current of the first PMOS transistor.

6. The temperature detection circuit of claim 2, wherein the PTAT current generator comprises:
   a third PMOS transistor having a source connected to the first power supply;
   a fourth PMOS transistor having a source connected to the first power supply, a gate connected to a gate of the third PMOS transistor, and a drain connected to its gate;
   a second NMOS transistor having a source connected to the second power supply, a drain connected to a drain of the third PMOS transistor, and a gate connected to the drain of the third PMOS transistor;
   a third NMOS transistor having a source connected to the second power supply, a drain connected to the drain of the fourth PMOS transistor, and a gate connected to a drain of the second NMOS transistor; and
   a resistor connected between the third PMOS transistor and the second NMOS transistor.

7. The temperature detection circuit of claim 2, wherein the PTAT current generator comprises:
   a third PMOS transistor having a source connected to the first power supply;
   a fourth PMOS transistor having a source connected to the first power supply and a gate connected to a gate of the third PMOS transistor;
   a second NMOS transistor having a drain connected to a drain of the third PMOS transistor, a source connected to the second power supply, and a gate connected to its drain;
   a third NMOS transistor having a source connected to the second power supply, a drain connected to a drain of the fourth PMOS transistor, and a gate connected to the gate of the second NMOS transistor; and
   a shunt resistor connected between the third NMOS transistor and the second power supply.

8. The temperature detection circuit of claim 7, wherein the shunt resistor has a value of 200 kΩ.

9. The temperature detection circuit of claim 7, wherein the PTAT voltage generator comprises:
   a fifth PMOS transistor having a source connected to the first power supply and a gate connected to the gates of the third and fourth PMOS transistors;
   a sixth PMOS transistor having a source connected to the first power supply and a gate connected to the gates of the third and fourth PMOS transistors;
   a fifth PMOS transistor having a source connected to the first power supply and a gate connected to the gates of the third and fourth PMOS transistors;
   a first resistor connected between a drain of the fifth PMOS transistor and the second power supply for defining the first alarm value;
   a second resistor connected between a drain of the sixth PMOS transistor and the second power supply for defining the second alarm value; and
   a bi-polar junction transistor (BJT) having an emitter connected to a drain of the seventh PMOS transistor, a base connected to the second power supply, and a collector also connected to the second power supply.

10. The temperature detection circuit of claim 9, wherein the comparator comprises:
    a first op amp having a positive terminal connected to the drain of the seventh PMOS transistor and a negative terminal connected to the node between the fifth PMOS transistor and the first resistor;

a second op amp having a positive terminal connected to the drain of the seventh PMOS transistor, and a negative terminal connected to the node between the sixth PMOS transistor and the second resistor; and a XOR gate that receives the outputs of the first and second op amps, and outputs the alarm signal.

11. The temperature detection circuit of claim 9, wherein:

a first current moves from the fifth PMOS transistor to the first resistor, generating the first alarm value at a node between the fifth PMOS transistor and the first resistor; and a second current moves from the sixth PMOS transistor to the second resistor, generating the second alarm value at a node between the sixth PMOS transistor and the second resistor.

12. The temperature detection circuit of claim 11, wherein the first and second resistors and have different sizes to define different first and second alarm values.

13. The temperature detection circuit of claim 12, wherein the first resistor has a value of 1200 kΩ and the second resistor has a value of 500 kΩ.

14. A CMOS temperature detection circuit, comprising:

a start-up circuit for generating a start-up voltage, the start-up circuit including:
  a first PMOS transistor having a source connected to a first power supply;
  a first NMOS transistor having a drain connected to a drain of the first PMOS transistor at a first node, a source connected to a second power supply, and a gate connected to the second power supply; and
  a second PMOS transistor having a source connected to the first power supply, and a gate connected to the drains of the first NMOS transistor and the first PMOS transistor at the first node;

a proportional to absolute temperature (PIAT) current generator formed using CMOS technology, coupled to the start-up circuit, for generating a PTAT current, wherein the start-up voltage turns on the PTAT current generator, and wherein the PTAT current generator uses the subthreshold characteristics of the CMOS technology to generate the PTAT current, wherein the PTAT current generator comprises:
  a third PMOS transistor having a source connected to the first power supply;
  a fourth PMOS transistor having a source connected to the first power supply and a gate connected to a gate of the third PMOS transistor, wherein the PTAT current is generated at a node between the gates of the third and fourth PMOS transistors;
  a second NMOS transistor having a drain connected to a drain of the third PMOS transistor, a source connected to the second power supply, and a gate connected to its drain;
  a third NMOS transistor having a source connected to the second power supply, a drain connected to a drain of the fourth PMOS transistor, and a gate connected to the gate of the second NMOS transistor; and
  a shunt resistor connected between the third NMOS transistor and the second power supply;

a PTAT voltage generator coupled to the PTAT current generator that receives the PTAT current and generates an inverse PTAT voltage and a PTAT voltage, wherein first and second alarm values are defined using the PTAT voltage; and a comparator circuit coupled to the voltage generator for comparing the inverse PTAT voltage to the first and second alarm values, respectively, and generating an alarm signal based on the comparison results.

15. The CMOS temperature detection circuit of claim 14, a size of the first NMOS transistor is larger than that of the first PMOS transistor.

16. The temperature detection circuit of claim 14, wherein the PTAT voltage generator comprises:

a fifth PMOS transistor having a source connected to the first power supply and a gate connected to the gates of the third and fourth PMOS transistors;

a sixth PMOS transistor having a source connected to the first power supply and a gate connected to the gates of the third and fourth PMOS transistors;

a seventh PMOS transistor having a source connected to the first power supply and a gate connected to the gates of the third and fourth PMOS transistors;

a first resistor connected between a drain of the fifth PMOS transistor and the second power supply for defining the first alarm value;

a second resistor connected between a drain of the sixth PMOS transistor and the second power supply for defining the second alarm value; and a bi-polar junction transistor (BJT) having an emitter connected to a drain of the seventh PMOS transistor, a base connected to the second power supply, and a collector also connected to the second power supply.

17. The temperature detection circuit of claim 16, wherein the comparator comprises:

a first op amp having a positive terminal connected to the drain of the seventh PMOS transistor and a negative terminal connected to the node between the fifth PMOS transistor and the first resistor;

a second op amp having a positive terminal connected to the drain of the seventh PMOS transistor, and a negative terminal connected to the node between the sixth PMOS transistor and the second resistor; and a XOR gate that receives the outputs of the first and second op amps, and outputs the alarm signal.

18. The temperature detection circuit of claim 17, wherein:

a first current moves from the fifth PMOS transistor to the first resistor, and the first alarm value is generated at a node between the fifth PMOS transistor and the first resistor; and a second current moves from the sixth PMOS transistor to the second resistor, and the second alarm value is generated at a node between the sixth PMOS transistor and the second resistor.

19. The temperature detection circuit of claim 18, wherein the comparator comprises:

a first op amp having a positive terminal connected to the drain of the seventh PMOS transistor and a negative terminal connected to the node between the fifth PMOS transistor and the first resistor;

a second op amp having a positive terminal connected to the drain of the seventh PMOS transistor, and a negative terminal connected to the node between the sixth PMOS transistor and the second resistor; and a XOR gate that receives the outputs of the first and second op amps, and outputs the alarm signal.

20. A CMOS temperature detection circuit, comprising:

a start-up circuit for generating a start-up voltage, the start-up circuit including:
  a first PMOS transistor having a source connected to a first power supply;

a first NMOS transistor having a drain connected to a drain of the first PMOS transistor at a first node, a source connected to a second power supply, and a gate connected to the second power supply; and a second PMOS transistor having a source connected to the first power supply, and a gate connected to the drains of the first NMOS transistor and the first PMOS transistor at the first node;

a proportional to absolute temperature (PIAT) current generator formed using CMOS technology, coupled to the start-up circuit, for generating a PTAT current, wherein the start-up voltage turns on the PTAT current generator, and wherein the PTAT current generator uses the sub-threshold characteristics of the CMOS technology to generate the PTAT current, wherein the PTAT current generator includes:

a third PMOS transistor having a source connected to the first power supply;

a fourth PMOS transistor having a source connected to the first power supply and a gate connected to a gate of the third PMOS transistor, wherein the PIAT current is generated at a node between the gates of the third and fourth PMOS transistors;

a second NMOS transistor having a drain connected to a drain of the third PMOS transistor, a source connected to the second power supply, and a gate connected to its drain;

a third NMOS transistor having a source connected to the second power supply, a drain connected to a drain of the fourth PMOS transistor, and a gate connected to the gate of the second NMOS transistor; and a shunt resistor connected between the third NMOS transistor and the second power supply;

a PTAT voltage generator coupled to the PTAT current generator that receives the PTAT current and generates an inverse PTAT voltage and a PTAT voltage, wherein first and second alarm values are derived using the PTAT voltage, wherein the PTAT voltage generator includes:

a fifth PMOS transistor having a source connected to the first power supply and a gate connected to the gates of the third and fourth PMOS transistors;

a sixth PMOS transistor having a source connected to the first power supply and a gate connected to the gates of the third and fourth PMOS transistors;

a seventh PMOS transistor having a source connected to the first power supply and a gate connected to the gates of the third and fourth PMOS transistors;

a first resistor connected between a drain of the fifth PMOS transistor and the second power supply for defining the first alarm value;

a second resistor connected between a drain of the sixth PMOS transistor and the second power supply for defining the second alarm value; and a bi-polar junction transistor (BJT) having an emitter connected to a drain of the seventh PMOS transistor, a base connected to the second power supply, and a collector also connected to the second power supply; and a comparator circuit coupled to the voltage generator for comparing the inverse PTAT voltage to the first and second alarm values, respectively, and generating an alarm signal based on the comparison results.

* * * * *